(12) United States Patent
Peterka et al.

(10) Patent No.: US 8,825,551 B2
(45) Date of Patent: Sep. 2, 2014

(54) DIGITAL RIGHTS MANAGEMENT FOR LOCAL RECORDING AND HOME NETWORK DISTRIBUTION

(75) Inventors: Petr Peterka, San Diego, CA (US); Alexander Medvinsky, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 1302 days.

(21) Appl. No.: 11/321,210

(22) Filed: Dec. 29, 2005

(65) Prior Publication Data

US 2006/0242069 A1 Oct. 26, 2006

Related U.S. Application Data

(60) Provisional application No. 60/674,019, filed on Apr. 21, 2005.

(51) Int. Cl.
*G06Q 99/00* (2006.01)
*G06Q 20/00* (2012.01)

(52) U.S. Cl.
CPC ............ *G06Q 20/00* (2013.01); *G06Q 2220/00* (2013.01); *G06Q 2220/10* (2013.01); *G06Q 2220/18* (2013.01)
USPC .................................. 705/59; 705/50; 705/51

(58) Field of Classification Search
USPC ............................................... 705/50–51, 59
See application file for complete search history.

(56) References Cited

U.S. PATENT DOCUMENTS

| | | | |
|---|---|---|---|
| 7,003,107 B2* | 2/2006 | Ananth | 380/37 |
| 7,035,827 B2* | 4/2006 | Ezaki | 705/51 |
| 7,103,181 B2* | 9/2006 | Ananth | 380/37 |
| 7,111,171 B2* | 9/2006 | Collens et al. | 713/176 |
| 7,181,620 B1* | 2/2007 | Hur | 713/171 |
| 7,243,366 B2* | 7/2007 | Medvinsky et al. | 726/2 |

(Continued)

FOREIGN PATENT DOCUMENTS

| | | |
|---|---|---|
| WO | 2004006494 A1 | 11/2004 |
| WO | 2004097609 A1 | 11/2004 |

OTHER PUBLICATIONS

DRM Specification V2.0, Candidate Version 2.0—Dec. 10, 2004, Open Mobile Alliance, OMA-DRM-DRM-V2_0-20041210-C, 145 pages.*

(Continued)

*Primary Examiner* — James D Nigh
(74) *Attorney, Agent, or Firm* — Amin, Turocy & Watson, LLP

(57) ABSTRACT

The systems disclosed here provide a complete standards-based end-to-end scalable system for storage, delivery and in-home distribution of digital content over IP networks using standard protocols such as Real-time Transport Protocol ("RTP") or IP-encapsulated MPEG-2 Transport Stream, or traditional MPEG-2 networks. Mechanisms are provided for receiving content from one security domain, re-encrypting that content uniquely for a receiving device, persistently storing that content, and playing back that content at a later time to and within another security domain. The systems also provide the ability to stream the persistently-stored content from the initial receiving device to another device that has been authenticated as part of a, e.g., home network. This allows a media server, e.g., a dual-tuner set-top box ("STB") with hard drive, to deliver recorded content to any TV in the house by streaming to media clients such as STBs.

4 Claims, 5 Drawing Sheets

(56) References Cited

U.S. PATENT DOCUMENTS

| | | | |
|---|---|---|---|
| 7,702,109 B2* | 4/2010 | Futa et al. ............... | 380/277 |
| 8,312,252 B2* | 11/2012 | Ezaki ...................... | 712/220 |
| 2001/0017920 A1 | 8/2001 | Son et al. | |
| 2002/0085710 A1* | 7/2002 | Ananth ................... | 380/37 |
| 2002/0120574 A1* | 8/2002 | Ezaki ...................... | 705/51 |
| 2002/0176572 A1* | 11/2002 | Ananth ................... | 380/37 |
| 2003/0079042 A1 | 4/2003 | Yamanaka et al. | |
| 2003/0093694 A1 | 5/2003 | Medvinsky et al. ..... | 713/201 |
| 2004/0010694 A1* | 1/2004 | Collens et al. .......... | 713/177 |
| 2005/0071669 A1 | 3/2005 | Medvinsky et al. ..... | 713/200 |
| 2005/0187880 A1* | 8/2005 | Ezaki ...................... | 705/59 |
| 2005/0198506 A1* | 9/2005 | Qi et al. .................. | 713/170 |
| 2006/0185022 A1 | 8/2006 | Yamanaka et al. | |

OTHER PUBLICATIONS

DRM Specification 2.0, Candidate Version 2.0—Dec. 10, 2004, Open Mobile Alliance, OMA-DRM-DRM-V2_0-20041210-C, 145 pages.*

SVP Open Content Protection System Technical Overview, Jan. 3, 2005, 51 pages, Secure Video Processing License Authority.*

Zhu, L., "Draft-IETF-CAT-Kerberos-PK-INIT-31," Public Key Cryptography for Initial Authentication in Kerberos, published draft document, Dec. 21, 2005, 42 pgs.

Kohl, J. et al., "The Kerberos Network Authentication Service (V5)," rfc1510, Sep. 1993, 113 pages.

Krawczyk, H. et al., "HMAC: Keyed-Hashing for Message Authentication," rfc2104, Feb. 1997, 13 pages.

Housley, R., et al., "Internet X.509 Public Key Infrastructure Certificate and Certificate Revocation List (CRL) Profile," rfc 3280, Apr. 2002, 131 pages.

Advanced Encryption Standard (AES), Federal Information Processing Standards Publication 197, Nov. 26, 2001, 51 pages.

Secure Hash Standard, Federal Information Processing Standards Publication 180-1, Apr. 17, 1995, 18 pages.

POD Copy Protection System, ANSI/SCTE 41, 2004, 78 pages.

OpenCable™ CableCARD™ Copy Protection System Interface Specification, OC-SP-CCCP-IF-I15-041119, Copyright 2000-2004, 33 pages.

Program and System Information Protocol for Terrestrial Broadcast and Cable (Revision B), ATSC Standard, Doc. A/65B, Mar. 18, 2003, 158 pages.

SEC 1: Elliptic Curve Cryptography, Certicom Research, Sep. 20, 2000, 98 pages.

Extended European Search Report, RE: Application #06758210.6; Jan. 27, 2012.

Open Mobile Alliance, "DRM Specification—Candidate Version 2.0 (OMA-DRM-DRM-V2 0-20040716-C)," www.openmobilealliance.org/relevase_program/docs/DRM/V2, Jul. 16, 2004. Part 1.

Open Mobile Alliance, "DRM Specification—Candidate Version 2.0 (OMA-DRM-DRM-V2 0-20040716-C)," www.openmobilealliance.org/relevase_program/docs/DRM/V2, Jul. 16, 2004. Part 2.

Canadian Intellectual Property Office, Nov. 26, 2013, all pages.

* cited by examiner

DIGITAL RIGHTS MANAGEMENT FOR LOCAL RECORDING AND HOME NETWORK DISTRIBUTION

STATEMENT OF RELATED APPLICATION

This application claims the benefit of U.S. Provisional Patent Application Ser. No. 60/674,019, filed Apr. 21, 2005, which is incorporated herein by reference in its entirety.

FIELD OF THE INVENTION

The invention relates to devices and methods for protecting digital content within a home network environment.

BACKGROUND OF THE INVENTION

It is well-known that the digital nature of current media presents significant challenges with respect to protection of rights of such content. In particular, current home media hubs and personal or local networks have difficulty protecting high-value content against, e.g., unauthorized copying within the network. These problems are compounded when content is distributed within a personal network, and stem from a lack of capabilities of maintaining and enforcing copy protection and digital rights management ("DRM") rules, as well as from the translation from incoming and outgoing copy protection and DRM rules to those of the personal network.

DETAILED DESCRIPTION

The systems disclosed provide a complete standards-based end-to-end scalable DRM system for storage, delivery and in-home distribution of digital content over IP networks using standard protocols such as Real-time Transport Protocol ("RTP") or IP-encapsulated MPEG-2 Transport Stream, or traditional MPEG-2 networks. The systems are employed to protect digital content and to enforce DRM and copy protection rules for content added to the network and for content once within the network. A typical use for such systems would be an in-home media hub where protected content is downloaded and distributed.

The systems may be used in at least the following types of models: stand-alone environments to protect content stored on a personal digital recorder ("PDR"); networking environments to secure distributed content within the user authorized domain, i.e., a home or business network; and end-to-end content distribution systems which protect content at the service provider site and during its distribution to the end user.

The IPRM system allows content owners and service providers to deliver content in a secure manner so that the content owner's rights are protected, and business models and contracts enforced, while simultaneously providing end-users such as consumers with seamless and easy-to-use content consumption controls. IPRM provides a mechanism for receiving content from one security domain, re-encrypting that content uniquely for a receiving device, persistently storing that content, and playing back that content at a later time to and within another security domain. IPRM also provides the ability to stream the persistently-stored content from the initial receiving device to another device that has been authenticated as part of the home network. This allows a media server, e.g., a dual-tuner set-top box ("STB") with hard drive, to deliver recorded content to any TV in the house by streaming to media clients such as STBs. Of course, it is noted that while a home network is described, extensions to a business or other such local network are analogous.

Figure 1:
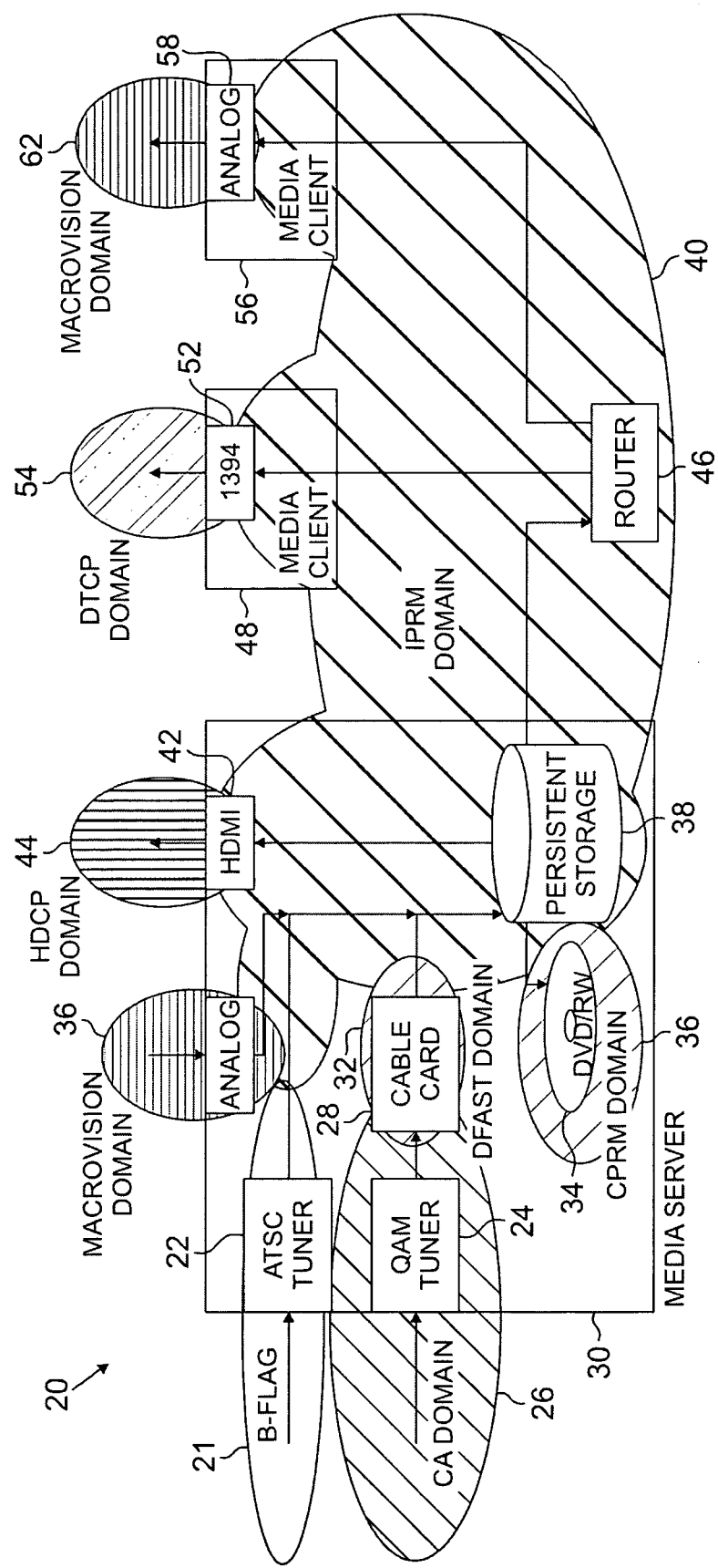
FIG. 1 shows a digital rights management system employing multiple input and display devices and a source of persistent storage.

In more detail, FIG. 1 shows an IPRM system 20 employing multiple inputs, display devices, and a personal digital recorder ("PDR") or media server 30. Specifically, this shows an Internet Protocol Rights Management ("IPRM") system employed in the home network for the purposes of receiving, recording, playing back, and streaming, copying or moving audio-video multimedia content in the home network. In this case, IPRM provides the DRM system that translates and enforces copy protection and digital rights management rules that are received from the input stream and applied on the output stream. The PDR 30 includes a source of persistent storage 38, such as a hard drive, flash memory, etc., or a combination of types of devices.

The content on PDR 30 may be protected and associated with content access rights. The content rights that apply to the content stored on a persistent storage device such as PDR 30 also apply to the other devices in the IPRM domain. For example, if the content is to expire after some period of time, the rule has to be enforced on each device that is a member of the IPRM domain. There may be devices in the IPRM system that lack persistent storage, i.e., that do not persistently save the encrypted content or any of the associated information, e.g., keys, persistence rules and metadata. These devices may still have additional digital or analog output ports that must be enabled or disabled, depending on the copy protection rules associated with the content.

Various inputs lead into the PDR 30. The following inputs are shown: an ATSC tuner 22 which receives signals corresponding to digital television, broadband, etc., which signals, within domain 21, are protected by, e.g., a broadcast flag (or ATSC Redistribution Control Descriptor) technique; a QAM tuner 24 for signals within domain 26 which are protected by, e.g., a Conditional Access ("CA") technique, these signals being transmitted to a digital interface such as CableCard 28 that handles signals in domain 32 protected by, e.g, a Dynamic Feedback Arrangement Scrambling Technique ("DFAST"); a DVD/RW source 34 to service signals in domain 36 protected by, e.g., a Content Protection for Recordable Media ("CPRM") or DVD Content Scrambling System (CSS) technique. DVD source 34 both receives and provides content. Other inputs may include digital signals in domain 36, which are, e.g., protected by other proprietary systems. At each input domain boundary, rules information, e.g., CCI, APS, CIT, CGMS-A, may be imported and securely linked with the received media.

Outputs from the PDR 30 include a High Definition Multimedia Interface ("HDMI") 42 protected by a High-Definition Digital Content Protection ("HDCP") domain 44. A router 46 is employed to rout signals to other devices in the home network, including, e.g., a media client 48 with a Firewire or IEEE-1394 interface 52 protected by a Digital Transmission Content Protection ("DTCP") domain 54.

Another output is a media client 56 with an analog interface 58 protected by Macrovision or CGMS-A in an analog domain 62. The media server 30 with its outputs and an optional router 46 and client devices 48 and 56 are collectively referred to here as operating within an IPRM domain 40. The persistent storage 38 may also output to an optical or other drive, such as DVD/RW drive 34.

At each output boundary, and as noted above in connection with input boundaries, rules information is exported to the appropriate output control mechanism. This boundary rules information is discussed in more detail below.

One of the devices, typically a PDR, Home Gateway, STB, etc., in the home of a user, serves as a media hub or server. This device serves as the Home KDC to provision other IPRM devices in the home to establish a trusted IPRM domain. An authentication service described below is used to then provision other devices into the trusted domain using their IPRM certificates. A key management service is used to distribute content keys within the authorized home network.

Optionally, at least one device within the home network is capable of authenticating directly with an external server. This device is designated as the IPRM gateway and is responsible for external authentication and verification with a Certificate Revocation List ("CRL"). This device may be the same as the Home KDC. This configuration is necessary when the content provider (e.g. cable head-end) needs a certain level of control, such as enabling the recording functions, controlling the size or which device may join the secure home network, etc.

The components of the IPRM system 20 can be grouped into subsystems, each of which is described in greater detail below. These subsystems interact with other devices throughout the system, including STBs and their accompanying display devices, to share the content resident within or sent to the IPRM system 20. These subsystems include a provisioning and ticket management subsystem and a key management subsystem. The provisioning subsystem allows new devices to be connected to the home network. The ticket management subsystem allows tickets to be used to allow access to content, and is primarily represented by a key distribution center ("KDC"), which has two components: an authentication service ("AS") for authentication of users and granting of the initial ticket (ticket granting ticket, or TGT), and a ticket granting service ("TGS") for issuing tickets for specific services. The main function of the KDC is to keep track of all the provisioned clients and servers in a system and the cryptographic data associated with them. Additionally, the KDC authenticates client devices and issues tickets for those client devices to use during client-server communications. Certain additional details of the implementation of such subsystems are provided in co-pending U.S. patent application Ser. No. 10/092,347, filed Mar. 4, 2002, entitled "Key Management Protocol and Authentication System for Secure Internet Protocol Rights Management Architecture", assigned to the applicant of the present invention and incorporated by reference herein in its entirety. The same mechanism is used to establish the trusted domain in the home network, possibly simplified by combining the AS and TGS service, thus issuing the service ticket without the intermediate TGT.

Various options exist to share content with the IPRM system. These include: streaming content from the gateway to another device, copying content from a storage device to another storage device, and moving content from a storage device to another storage device. In general, there are two main scenarios that are applicable for local content protection: secure recording of content and secure playback of content. The detailed steps of these scenarios are described below with respect to FIGS. 2 and 3.

Figure 2:
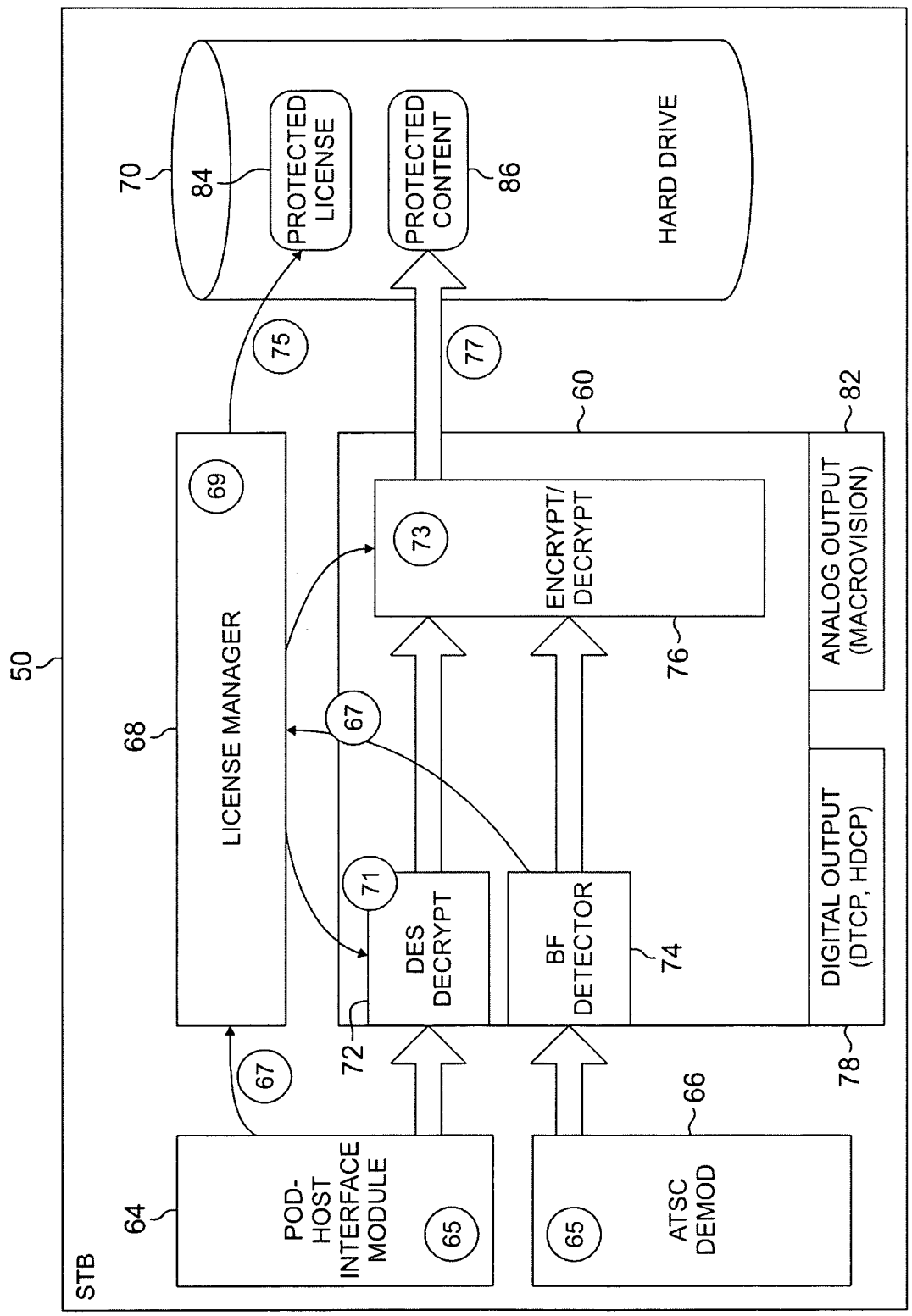
FIG. 2 shows an example of a system illustrating a method of content recording.

For content recording, and referring to FIG. 2, a set-top box ("STB") 50 is shown in which several modules 64 and 66 are shown for receiving and interfacing with outside signals. Other sources of content may be used, such as IEEE1394/DTCP, analog signal with CGMS-A or Macrovision, protected IP input, DVD/CSS, etc. The STB 50 further includes a license manager 68 to control distribution of and access to licenses to protected content. Hard drive 70 stores content 86 and licenses 84. A module 60 may include decryptor 72 and broadcast flag detector 74 for decryption or other control of content from modules 64 and 66. An encryption/decryption module 76 allows the subsequent re-encryption of protected content or keys such that the same is substantially never available in an un-encrypted form The content is received into the STB 50 from any of the external sources described above, e.g., such as a CableCard, an analog signal, an ATSC signal, a signal from an IEEE-1394 source (not shown), and the like (step 65). In FIG. 2, this signal is shown as being processed by, e.g., ATSC demodulator 66 or a point-of-deployment ("POD") host interface module 64. Content from POD module 64 may be decrypted by, e.g., decrypt module 72 which employs the data encryption standard ("DES"). Content from ATSC demodulator 66 may be passed through Broadcast flag detector 74.

This content may be protected. If it is protected, or otherwise employs access rights, a license is requested from the license manager 68 (step 67). The license may include content rights and restrictions translated from Copy Control Information ("CCI"), EMI information, APS, CIT, SGMS-A, etc. If the content is permitted to be recorded, a local license, protected to maintain its integrity, is created by license manager 68 (step 69). In particular, IPRM processes incoming CCI and/or EMI information, determines whether the associated content can be recorded and if recording is permitted, it translates the relevant copy control data into the internal license format.

The license so created contains a protected locally-generated unique content encryption key and a set of access rules associated with the content. The license is signed to prevent unauthorized rules modifications. The rules stored in the license must be checked before a playback of recorded content is allowed. The information stored in the license may be used to set protection technologies on all relevant output interfaces, including DTCP, HDCP, CGMS-A and Macrovision. The license is securely bound to the recorded content using encryption. The IPRM system, and in particular license manager 68, generates a unique encryption key for each recorded piece of content. This key is stored in the license in a protected form so that the content cannot be used, e.g., decrypted for playback or for further copying, without using the corresponding license. Each device possesses a device-unique key to encrypt the content encryption key inside the license and to sign the license itself for integrity purposes. This prevents end-users from taking an unauthorized copy of the protected content and the associated license to another device. The license may be constructed using input from other protection systems associated with the content source, such as CableCARD, Broadcast Flag, DTCP, analog protection such as CGMS-A, Macrovision, etc.

The content is then decrypted (step 71) using the original protection mechanism, e.g., CableCard, DTCP, etc., and the same is immediately re-encrypted using encryption/decryption engine 76 (step 73) using the protected locally-generated unique content encryption key, such that the content is substantially never available in the absence of protection. The local license 84 is then protected against unauthorized modifications and stored in persistent storage (step 75) such as hard drive 70. In this case, the persistent storage may also be, e.g., flash memory, etc. The content itself may also be stored in a protected format 86 in persistent storage (step 77) such as hard drive 70 (or a recordable DVD, flash memory card, etc.).

Figure 3:
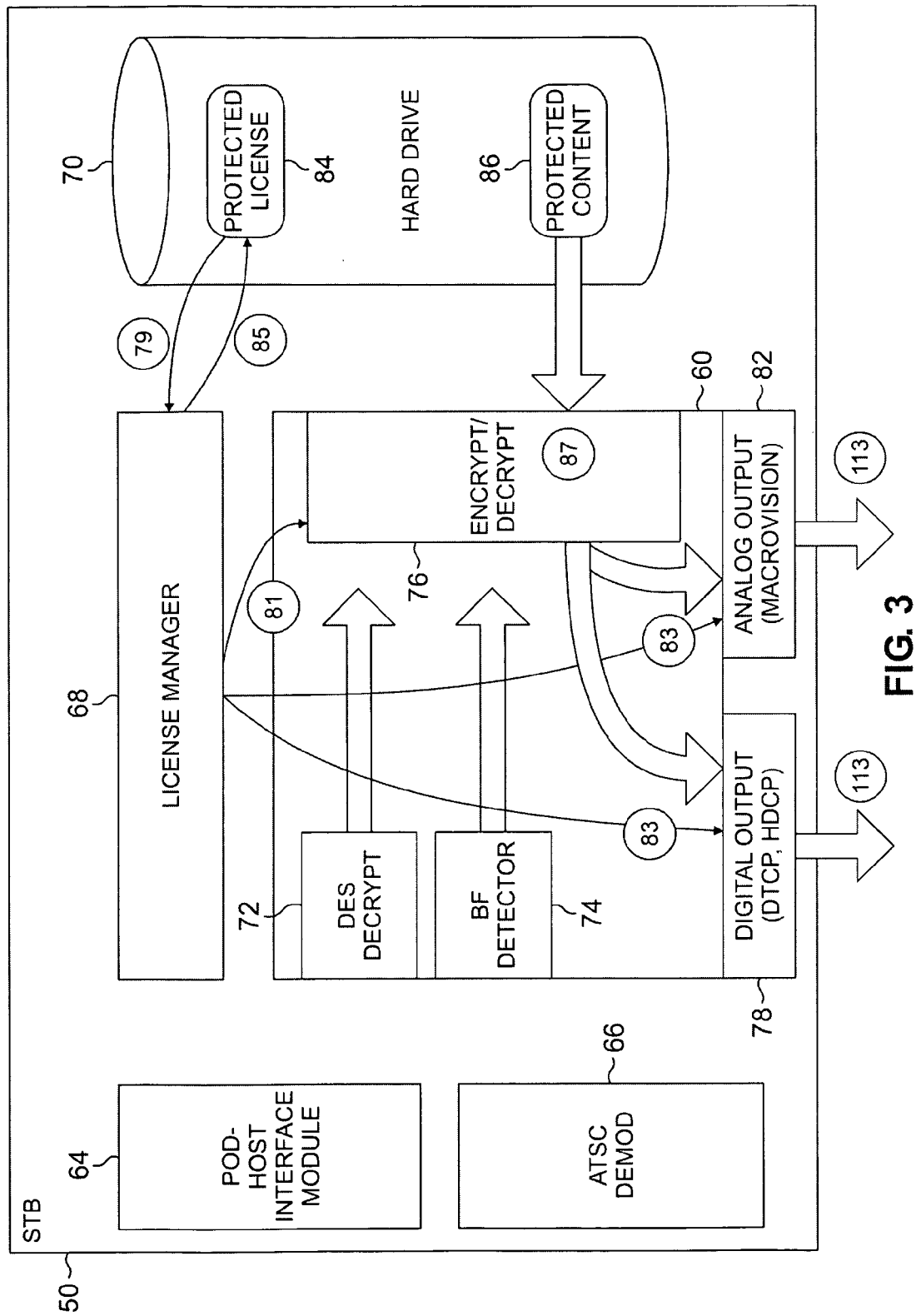
FIG. 3 shows an example of a system illustrating a method of secure playback.

For content playback in more detail, referring to FIG. 3, the following steps are performed. Before stored protected content 86 is played back, the associated license 84 is checked for integrity with the license manager (step 79). All applicable content access rules stored in the license 84 are enforced for this content, e.g., viewing window, number of playbacks to an external interface, type of playbacks to an external interface, video resolution of output, e.g., constrained image, time windows, size of pause buffer, etc. If the license 84 permits the consumption of the content 86, the content decryption key is extracted from the license, decrypted and used by the encryption/decryption engine 76 (step 81) to decode the content. If the content is consumed on an external device, e.g., a digital TV, the corresponding digital output 78 or analog output 82 is configured (step 83) to protect the content according to the copy-protection information stored in the license. This copy protection information may be exported to DTCP, HDCP, Macrovision or some other copy protection system and may include CCI, APS, constrained image, etc. This may include updating the license (step 85), e.g., to decrement a playback count. After these steps are performed, the content can be read off the disk, decrypted and optionally decoded (step 87), and output for consumption (step 113). Pursuant to the configuration step above, if the content is output on a secure interface, the content may be protected using the corresponding copy protection technology, e.g. DTCP, HDCP, CGMS-A, Macrovision, etc. Similarly, for content output to a digital removable medium, e.g., a DVD-RW, a corresponding protection technology such as VCPS or CPRM or CSS may be employed. Certain additional details of the implementation of such copy protection schemes are provided in co-pending U.S. patent application Ser. No. 10/933,011, filed Sep. 2, 2004, entitled "Separation of Copy Protection Rules", assigned to the applicant of the present invention and incorporated by reference herein in its entirety.

A secure content transfer within the home network is detailed below in connection with FIG. 4. In general, when two end-points want to securely stream, copy or move content between them, a secure session is established which includes a set of symmetric keys that both end-points share and use to encrypt, decrypt and authenticate individual packets. This portion of the IPRM system may employ symmetric cryptography, so that latency and server loading are minimized during session set-up. The secure session is used to communicate control and rights information, as well as key exchange. Content is transmitted over a separate channel secured by encryption for persistent content.

Figure 4:
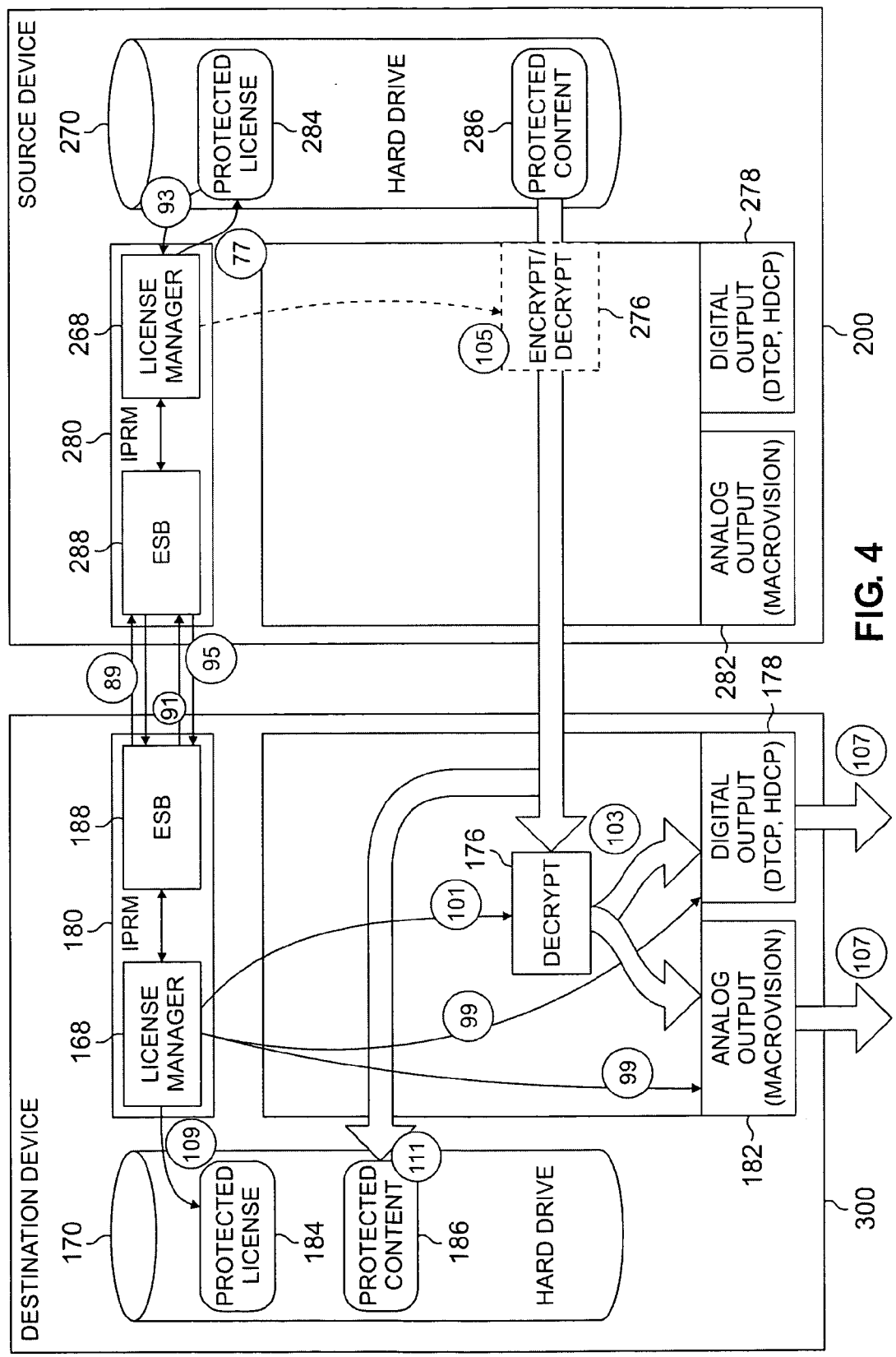
FIG. 4 shows an example of a system illustrating a secure playback of protected content across the home network.

In more detail, and referring to FIG. 4, a source device 200, which may be an STB/PDR, is shown having a hard drive 270 storing protected license 284 and protected content 286. An encryption/decryption module 276 is employed to optionally re-encrypt protected content such that the same copy is never encrypted using the same key. An IPRM system 280 is employed having a license manager 268 and a system termed an Electronic Security Broker ("ESB") 288, which is described in greater detail in the co-pending patent applications referenced elsewhere in the specification. In the same way, a destination device 300, which may be an STB, is shown having a hard drive 170 storing protected licenses 184 and protected content 186. An encryption/decryption module 176 is employed for the same reason as that described above, as is analog output 182 and digital output 178. An IPRM system 180 is employed having a license manager 168 and an ESB 188.

First, before content 286 can be streamed or copied to another authorized device, the source device 200 and the destination device 300 must authenticate each other (step 89). This authentication may be performed in a number of ways and is discussed in greater detail below.

To transfer content, a destination device 300 requests the playback, copy or move of a specified piece of content 286 having license 284 stored on source device 200 (step 91). The destination device 300 may further specify a use for the licensed content, e.g., a specified number of playbacks, etc. The source device 200 retrieves information about the license 284 from the license manager 268 within IPRM system 280 (step 93). The source device 200 checks the license for integrity and verifies that the requested rights can be granted, e.g. that the license has not expired, that the playback count has not been exhausted, that the copy protection has not been violated, etc. Assuming the rights can be granted, then the content decryption key is extracted from the license and together with the requested rights is securely communicated back to the destination device 300 (step 95). In some cases, the original license 284 may be updated accordingly by the license manager 268 (step 77). If the content is intended to be output on an approved protected interface, such as analog output 182 or digital output 178, then the corresponding parameters, e.g., CCI, are communicated to that interface module for subsequent content protection (step 99). Once the destination device 300 obtains the decryption keys, it configures the decryption engine 176 (step 101). At this point the content transfer process may commence (step 103). Note that the content may be optionally re-encrypted by the encryption/decryption engine 276 of the source device (step 105). Note that step 95 will deliver this new key instead.

Decrypted content may then be optionally decoded and output to an allowed interface, such as analog output 182 or digital output 178 (step 107). If the content is going to be recorded on the destination device 300, a corresponding license 184 with the acquired rights and a decryption key is created, in a manner the same as that described in connection with FIG. 2 (step 109). The content may then be stored in its encrypted form on hard drive 170 as protected content 186 associated with protected license 184 (step 111). Optionally, a local re-encryption may be performed (similar to the initial recording scenario), in which case the new encryption key is stored in the local license. The content may be played back as described in connection with FIG. 3.

Before devices located in end-users' homes can receive content from the infrastructure, the same need to be properly added to the network, e.g. provisioned with Infrastructure KDC. In addition, devices require proper provisioning into the home network, as well as authentication and authorization for any services.

When a new client wants to provision with the service provider, the client contacts an offsite provisioning server, signs up for services, and obtains IPRM configuration data. Then the client device, e.g. Media Hub, PVR, STB, etc., registers with the KDC using its digital certificate and the KDC stores the client's unique identity and public key in the KDC database. Once this is done, the client may be able to obtain tickets that will eventually allow them to decrypt on-demand and broadcast content.

Figure 5:
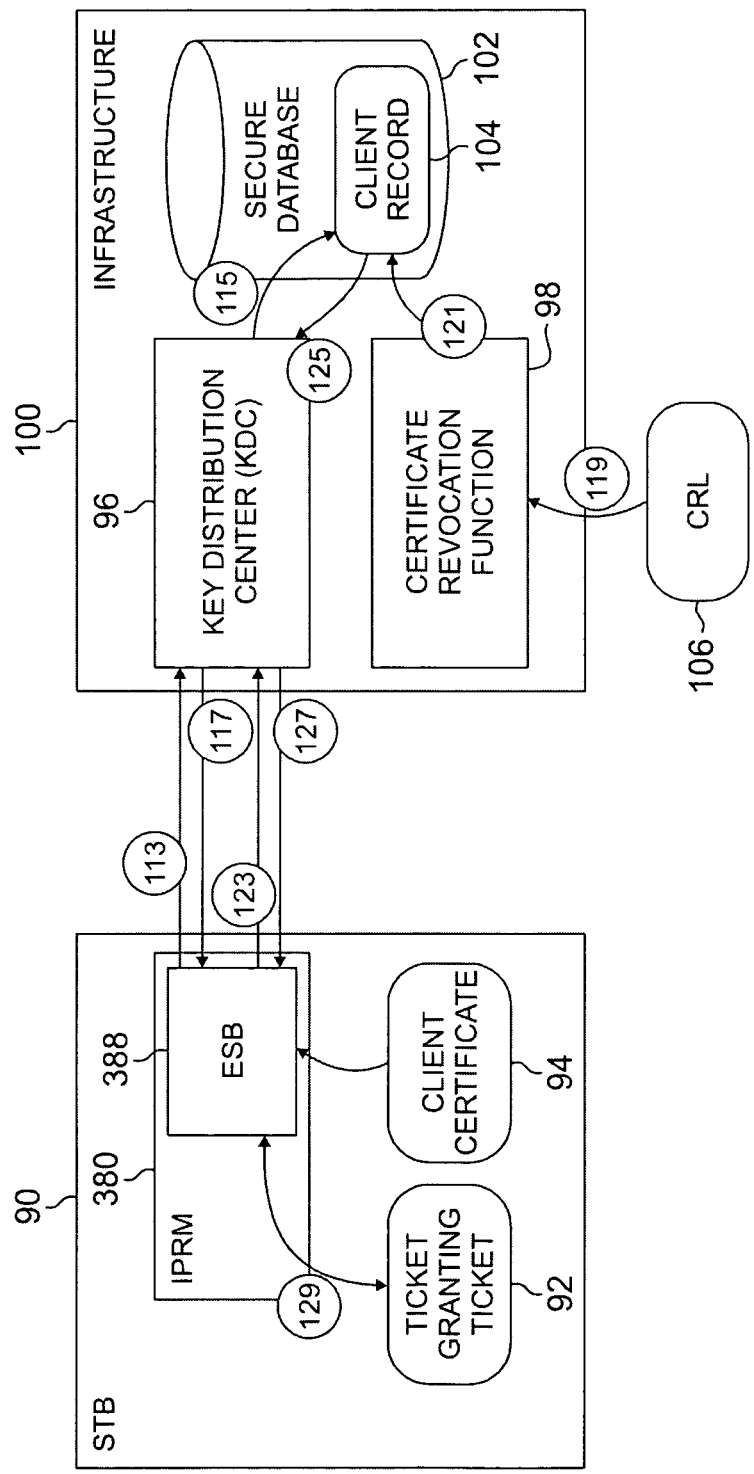
FIG. 5 shows an example of a system illustrating a method of creating a trusted domain and joining new devices to such domain.

In more detail, referring to FIG. 5, an STB 90 is shown with an IPRM system 380 including an ESB 388. IPRM 380 and ESB 388 are responsible for the control of ticket-granting tickets 92 and client certificates 94 to and from STB 90.

Within the provisioning device 100 is provided a key distribution center 96 which may access a secure database 102 with client records 104 therein. A certificate revocation module 98 is provided which accesses a certificate revocation list 106, which is discussed in more detail below. It is noted here that the term "provisioning device" is used generically—the same may be part of an STB, PDR, or other such device with administrative capabilities, and may be the IPRM gateway.

The following steps outline the provisioning method. The first time a device, e.g., STB 90, is to be provisioned into the network, the same presents a message including a security certificate 94 (step 113) to the KDC 96 within the infrastructure or provisioning device 100. The KDC 96 verifies the message including the certificate and creates a record 104 in a secure database 102 (step 115) with the client's public key, certificate serial number and other information. In this sense, a client is defined as a device that receives a key from a KDC.

The KDC 96 responds with its own certificate (step 117) and the message, including the KDC certificate, is verified by the client before the same is considered provisioned to the service. The ESB subsystem within the client device issues and receives such certificates, which in FIG. 5 is shown as ESB 388.

The KDC may also periodically process updates to a certificate revocation list ("CRL") 106 (step 119). For example, the KDC 96 may search the secure database 102 (step 121) for clients matching the CRL entries. If a match is found, the device is marked as to-be-revoked. The secure KDC database, where individual records are signed to prevent unauthorized modification or accidental corruption of device information, may also be used by the KDC to detect cloning and other similar attacks.

Once a device is provisioned, the device may be authenticated and authorized for content. The device authentication and authorization may be based on the AS and TGS service of Kerberos or the ESB protocol described elsewhere. Referring back to FIG. 5, the following steps outline the method.

When a device requests access to any protected services, it may first obtain a Ticket Granting Ticket ("TGT") 92 with the device's authorization data. To do so, it sends a message signed by its private key to the KDC 96 (step 123). The KDC 96 verifies the status of the device by looking up the device record in the secure database 102 (step 125). The device record may be based in part on each client's unique cryptographic identity which may be loaded into a client device in the factory during manufacturing. This cryptographic identity forms part of the security certificate the device sends during provisioning. If the device is active, the KDC 96 may, if desired, extract the device's authorization data and in turn create a TGT, which it subsequently sends back to the requesting device (step 127). The device validates the message and stores the TGT for future use. That is, the KDC may allow clients to temporarily cache these tickets, eliminating transactions to the KDC before each request of content decryption keys from streaming servers. The TGT may be later used to obtain specific server tickets using a TGS message to obtain access to different services, e.g., IP VOD, content download, EPG service, etc. The TGT may be associated with an expiration time controlled by the KDC policy, e.g. days, weeks or months, based on the nature of the service, which would then require refreshing or renewing before requests may be made to access additional services or servers. Finally, it is noted that the KDC may further interact with a subscriber management system ("SMS") to request authorization data before it issues a new ticket to a client.

The ESB protocol used by the IPRM system allows the negotiation of the selection of these algorithms where a multiplicity of the same is available to achieve the highest level of protection. A Local Storage Encryption Key ("LSEK") is a key that is used to encrypt portions of IPRM content licenses. A Local Storage Authentication Key ("LSAK") is used to authenticate an IPRM content license. IPRM clients normally obtain persistent content rules that are protected by other means, e.g. CableCARD-Host Copy Protection, DTCP, etc. When a local copy of a content license is created based on the incoming content rules, the content decryption key is encrypted using the LSEK. A message authentication code ("MAC") that is also keyed with the LSAK is added to the license at the same time. The LSEK may be a 128-bit AES key which is not stored persistently. Instead, a secret value called LSS (Local Storage Seed) may be stored in an obfuscated form or protected by a security chip and the LSEK may then be derived from the LSS. LSAK is derived using the same method as specified for LSEK above, except that the key type in this case is for a symmetric Message Authentication algorithm such as HMAC SHA-1, or various other algorithms.

As noted above, the IPRM may accept content from a variety of protected inputs including CableCARD, ATSC broadcast, etc. The details of integration with the protection systems associated with each input are described below. These details include the rule selection at the boundaries of each input interface.

For CableCard, the IPRM system may interface with the CableCARD-Host Interface Module in order to perform two functions: (1) interpret the incoming CCI and translate it to the IPRM internal license format and (2) re-encrypt the incoming content for local storage. This is performed according to the relevant SCTE and OpenCable specifications. For ATSC, the IPRM system protects ATSC content by (1) converting Broadcast Flag (redistribution control descriptor) into the IPRM license format and (2) encrypting the incoming content for local storage if required by the Broadcast Flag presence. This is performed according to the relevant ATSC specification and/or FCC ruling. If an analog input is accompanied by CGMS-A information, the IPRM system may use this information to create the content license. IPRM may support other controlled inputs, e.g. DTCP, VCPS, etc.

As noted above, the IPRM system allows content to be exported from the IPRM domain to other approved outputs such as IEEE-1394/DTCP, DVI and HDMI/HDCP, analog outputs protected by Macrovision, etc. or transferred to other complete DRM systems such as OMA DRM. IPRM also protects content distributed over IP networks (e.g. Ethernet, WiFi, MOCA, etc.) to authorized devices in the IPRM trusted domain. For DTCP, IPRM integrates with DTCP over 1394 such that it passes EMI information received from the content source, e.g., CableCARD, and enforces the proper CCI conversion. IPRM may also integrate with HDCP for DVI and HDMI outputs for protected content. For analog output, IPRM turns on, e.g., Macrovision as specified by the APS controls and passes on CGMS-A information. IPRM also triggers the lowering of video resolution of content as specified by the CIT control when outputting HD content over an analog output. IPRM may use the VCPS technology to protect content marked with the broadcast flag or designated as copy once when recorded to DVD+R/+RW. For IP output, protected content stored on the media hub must be protected also as distributed over IP-based interfaces within the IPRM trusted domain.

The ESB system of key management and ESB messages are described in more detail in the co-pending US Patent Application entitled "Key Management Protocol and Authentication System for Secure Internet Protocol Rights Management Architecture" incorporated by reference above.

As noted above, interfaces that are used to deliver content are protected using a system such as AES or 3DES encryption and optionally using a keyed hash such as SHA-1 HMAC where appropriate. To this end, asymmetric keys are generated in a secure facility and installed to the individual devices in the factory using a secure PKI Server protocol. Symmetric keys are generated by each device inside a security chip using a Random Number Generator (RNG) module or a special Pseudo-RNG software algorithm.

The above IPRM system may afford one or more advantages, such as the following. Content obtained over multiple types of interfaces not necessarily protected with IPRM may be securely captured and saved for future local playbacks under protection of IPRM Digital Rights Management without a requirement for additional communication with the infrastructure. Each content license contains a content decryption key that is unique to that particular content, which binds the associated content usage rules listed in the content license only to that specific content. Furthermore, the content decryption key in the license is encrypted using a key that is unique to a specific device, thus preventing re-use of the content by simply making a copy of the content and content license to another device. In order to transfer the content to another device, those two devices need to execute an IPRM-protected transaction that would only succeed if the destination device is authorized to receive the content with the requested set of rights. Furthermore, the system allows an operator to control various parameters of an IPRM-protected domain by control its size or the list of specific member devices. An operator can communicate this information through a secure ESBroker or Kerberos-based exchange between a Home KDC and an infrastructure KDC.

It should be noted that the description above refers to specific examples of the invention, but that the scope of the invention is to be limited only by the scope of the claims appended hereto.

Moreover, the process shown in the figures may be implemented in a general, multi-purpose or single purpose processor. Such a processor will execute instructions, either at the assembly, compiled or machine-level, to perform that process. Those instructions can be written by one of ordinary skill in the art following the description of the figures and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The invention claimed is:

1. A non-transitory computer readable medium storing computer-executable instructions that, in response to execution, cause a device comprising a processor to perform operations, comprising:
   a. Communicatively coupling a home key distribution center via a wide area network to an infrastructure key distribution center;
   b. Transmitting a security certificate via a wide area network to the infrastructure key distribution center;
   c. receiving a reply security certificate via the wide area network from the infrastructure key distribution center;
   d. sending a secure request via the wide area network for a ticket-granting ticket to the infrastructure key distribution center;
   e. receiving via the wide area network from the infrastructure key distribution center the ticket-granting ticket that provides authorization data that is used to determine which client device(s) are authorized to share content on a home network; and
   f. distributing a server ticket to another client device within the home network only when the other client device is determined to be authorized, based on the authorization data associated with the ticket granting ticket, to receive content from other devices in the home network, wherein the server ticket identifies a client device operating as a server within the home network, and wherein the server ticket can be used by the other client device to obtain content from the server using a content key generated by the server that is unique to a combination of the server and the content and wherein the content key has been encrypted by a key that is unique to the server, and wherein the content is encrypted with the content key.

2. The non-transitory computer-readable medium of claim 1, further comprising instructions for forwarding authorization data from the home key distribution center to other devices in the home network.

3. The non-transitory computer-readable medium of claim 1, wherein the instructions that control the home key distribution center further enable the home key distribution center to securely receive operator updates to the authorization data sent through the infrastructure key distribution center.

4. The non-transitory computer-readable medium of claim 3, wherein the authorization data contains data selected from the group consisting of: certificate revocation lists for infrastructure key distribution centers, home key distribution centers, or IP rights management (IPRM) clients; limits on the size of the home domain; a list of device identifiers that are allowed in the home domain; or combinations of the above.

* * * * *